Jan. 27, 1959  D. H. CARTER ET AL  2,871,445
WELL FLUIDS RESISTIVITY MEASUREMENT APPARATUS
Filed Nov. 30, 1956

INVENTORS.
DANIEL H. CARTER,
RICHARD H. HUDDLESTON JR,
BY

AGENT.

United States Patent Office 2,871,445
Patented Jan. 27, 1959

2,871,445

WELL FLUIDS RESISTIVITY MEASUREMENT APPARATUS

Daniel H. Carter and Richard H. Huddleston, Jr., Houston, Tex., assignors, by mesne assignments, to Welex, Inc., a corporation of Delaware Application November 30, 1956, Serial No. 625,384

10 Claims. (Cl. 324—30)

This invention generally relates to the electrical resistivity measurement of fluids and more particularly relates to improved apparatus for measuring the electrical resistivity of well fluids or the filter cakes of such fluids encountered in the drilling of wells.

This application is co-pendant with the application filed June 4, 1956, Serial No. 589,206, of Daniel H. Carter and Orville R. Smith entitled, "Drilling Mud Filter Cake Resistivity Measurement."

The need for accurate electrical resistivity measurements of drilling mud filtrates, drilling mud filter cakes, and other well bore fluids is of considerable importance in the interpretation of the various electrical logs recorded during the drilling and completion of a well. Such detected measurements have become of greater importance with the recent practice of placing the current and potential measuring electrodes of electrical logging systems, which were formerly widely spaced, in very close relation and on an insulated pad placed in contact against a well bore wall. It is seen that such close spacing of the measuring electrodes result in measurement, to a large extent, of the mud filter cake plastered against the well bore wall and of the mud filtrate which has permeated into the immediately adjacent formation.

It has therefore become an accepted practice to measure the electrical resistivity of the drilling mud, the drilling mud filtrate, and the drilling mud filter cake at each situation where such electrical logs are made. Various apparatus have been provided to make such resistivity measurement and are presently used and commonly known. For an example of such resistivity measuring apparatus, reference may be had to Patent No. 2,599,413 to Reichertz.

Such apparatus generally employs two current electrodes and two potential electrodes intermediate said current electrodes. A known current is usually passed between said current electrodes through a cell containing a fluid sample to be measured. The electrical resistances of said sample creates a proportionate potential across said potential electrodes. The actual resistance of such a sample is then calculated with knowledge of such potential and said known current. Conversion of this actual measured resistance of the sample to specific resistivities, such in units of ohm/meter/meter$^2$, requires further calculation. Such apparatus is often complicated and difficult to use by relatively unskilled field workers.

Thus it is seen that some disadvantages to the present apparatus now available is that calculations must be made in order to determine the resistivity, or, in some cases, multiple measurements must be made to determine the resistivity of the sample.

It is of course realized that more measurements or calculations made, especially under field conditions, can cause more possible inherent sources of error.

It is therefore the general objects of this invention to provide improved electrical resistivity measurement apparatus of the four electrode type with which electrical resistivity determinations made of various well fluids are accurate, are simple to obtain, are in resistivity units commonly used in well bore resistivity determinations, and may be so obtained by simple procedure.

In accordance with this invention there is provided apparatus for determining the resistivity of a well fluid contained in a sample cell of the four electrode type comprising, a first circuit powered by a source of alternating current and connected to a first current electrode and a second current electrode of said cell. Electrical communication between said first and said second current electrode is provided through a fluid sample to be measured. Said first circuit has means to provide a current through a second circuit which is proportionate to a current flowing in said first circuit and variable in direct response to that current in said first circuit. A calibrated shunting means is provided in said second circuit for dividing the current flow through said second circuit in proportion of the geometry of said sample cell to the geometry of a desired unit of specific resistivity. A potentiometer is provided in said second circuit, one terminal of said potentiometer and the tap of said potentiometer being adapted to exhibit a potential varied by adjustment of said potentiometer. Said potentiometer is connected to a first and a second potential electrode of said sample cell in such manner that said potential drop across said potentiometer may be compared to the potential created across said potential electrodes by a null indication means. Said null indication means is connected between one of said potential electrodes and one source of potential across said potentiometer whereby a potential equal to that found across said potential electrodes may be observed when provided by adjustment of said potentiometer. The calibration of said potentiometer is such that, when said shunting means is adjusted to provide a division of current flow through said potentiometer which is in proportion to the geometry of a particular sample cell, said potentiometer may be adjusted to provide said equal potential and the indicated ohms resistance tapped across said potentiometer will be equal to, or a decade factor of, the desired units of specific resistivity of a sample in said cell. If desired, said potentiometer may have potential ranges provided by the division of current flow through said potentiometer by a second shunting means, said second shunting means being adapted to divide current flow through said potentiometer without effect to total current flow through said second circuit.

Further objects and advantages of the invention will become readily apparent by reference to the following specific description taken in conjunction with the accompanying drawing.

Figure 1:
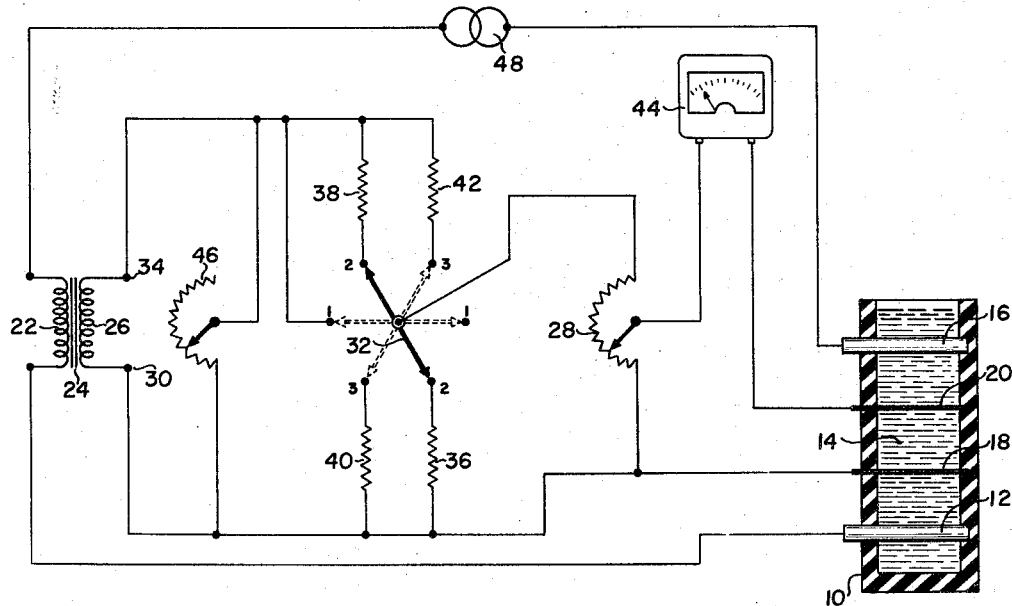
Figure 1 is a schematic circuit provided by the invention.

Now referring to Figure 1, there is illustrated a typical fluid sample cell 10 having therein a sample chamber 14. Near one end of sample chamber 14 is a first current electrode 12 and near the other end of chamber 14 is a second current electrode 16. Electrical communication between current electrodes 12 and 16 is provided by a fluid sample in chamber 14. Between current electrodes 12 and 16 are potential electrode 18 and potential electrode 20. Sample cells, such as that generally illustrated by cell 10, may vary considerably in configuration and size. A mud filter cake cell, such as that described in the above cited co-pending application, or the fluid "cups" presently used in the field, may be usefully provided in the circuit shown in Figure 1.

Current electrodes 12 and 16 are connected into a first circuit powered by an A. C. source 48. Also included in this first circuit is a means for providing a current in a second circuit, herein illustrated as a primary coil 22 of a current transformer 24. Source 48 may be any convenient source of such alternating current and of any suitable frequency, 1000 cycles being an example.

Since the voltage across current electrodes 12 and 16 and the current through the fluid sample in chamber 14 need not be known, the voltage and current supplied to this first circuit is not critical. As illustrated, the only limitation to current flow is primarily provided by the impedance of transformer 24 and secondarily provided by the resistance of the fluid sample in chamber 14. The only practical limitation to the magnitude of current flow through the sample in cell 14 is that such current should be kept below any level sufficient to heat the sample to be measured.

A secondary coil 26 of current transformer 24 supplies current to a second circuit primarily consisting of a potentiometer 28 shunted by a variable shunting resistor 46. Transformer 24 supplies a current to said second circuit in definite proportion and in direct response to that current flowing in said first circuit. The proportion of current through said second circuit to that current in said first circuit is not critical and may be of any convenient ratio from 1 to several. The ratio is herein exampled such that the current through said second circuit will be three times that of said first circuit.

Current ratios greater than one are herein provided to permit greater variation of current flow through potentiometer 28, thus providing a more varied potential range across potentiometer 28. As can be seen, varying the geometry of sample cell 10 will result in responsive variation of actual measured resistance, i. e., potential drop, for any fluid sample to be measured.

As previously mentioned, potentiometer 28 is connected in series with secondary coil 26 and is herein illustrated as being connected to a terminal 30 of said coil. The other terminal of potentiometer 28 is connected through the common terminal of an adjustable multi-pole switch 32 to a terminal 34 of secondary coil 26. Switch 32 is herein exampled as having 3 positions which are 1—1, 2—2, and 3—3. When the switch 32 is in position 1—1, the potentiometer 28, being connected to the common terminal of said switch, is directly connected to terminal 34 of secondary coil 26. When in position 2—2, potentiometer 28 is in shunt connection with a resistor 36 and in series connection with a resistor 38 to terminal 34. When so connected, the current flowing through said second circuit will be divided through both potentiometer 28 and resistor 36. The total effective resistance found across terminals 30 and 34 of transformer 24 will remain constant, however, and the current through secondary coil 26, therefore, will also remain constant. When switch 32 is in position 3—3, potentiometer 38 is in shunt connection with a resistor 40 and in series connection with a resistor 42. Position 3—3 of switch 32 then provides a different division of the current through potentiometer 28 but still provides the same effective resistance, and total current, as previously described. It is of course obvious that shunting resistor 46 must remain at one particular resistance value at every switch position described for such effective resistance and total current to remain constant.

As illustrated, potential electrode 18 is connected to terminal 30 of secondary coil 26. The connections of secondary coil 26 and potentiometer 28 are so provided that the potential drop between the terminal of potentiometer 28, which is connected to potential electrode 18, and the tap of potentiometer 28 is in phase to any potential created across potential electrodes 18 and 20. Potential electrode 20 is connected to a terminal of an A. C. null indicator 44. The other terminal of indicator 44 is connected to the tap of potentiometer 28.

It is preferable that null indicator 44 be of the logarithmic type such as are now commercially available. An example of a suitable indicator 44 is manufactured under the trade name of "Unit Null Detector," Type 1212–A, by the General Radio Company of Cambridge, Massachusetts.

Sample cells, such as that typically illustrated by cell 10, may be of various types. One of such cells is the mud filter cake cell described in the above cited co-pending application. Another type is that mud "cup" now in public use and generally illustrated in the above cited Patent to Reichertz. It is obvious that these cells may be of different geometry and of different capacity, i. e., that the actual resistance of a sample measured between their potential electrodes may vary considerably. As described in the above cited co-pending application, such cells are usually provided of such geometry that the actual resistance measured across the potential electrodes and a specific resistance of the fluids to be measured, which is usually in units of ohm/meter/meter$^2$, will result in some definite constant number which is indicated on each cell. In previous measuring apparatus this actual resistance of the fluids in cell 10, which was determined by calculations in reference to the current through cell 10 and the voltage found across potential electrodes 18 and 20, was then divided by such a cell constant to determine the specific resistivity of the sample. As herein provided, such specific resistivity determination is made within the circuit without resort to further calculation.

To provide for calibration of potentiometer 28 directly in such units of specific resistivity, shunting resistor 46 is provided to divide the current flowing through secondary coil 26 to such extent that the current flowing through potentiometer 28 multiplied by the resistance value tapped across potentiometer 28 will create an equal potential to that found across potential electrodes 18 and 20. Thus, the resistance provided by resistor 46 in shunt to secondary coil 26 will be in proportion to that constant previously described for sample cell 10. When the resistance provided by shunt resistor 46 is of proper value, the actual ohms resistance of potentiometer 28 will indicate direct or decade multiple units of the specific resistivity of a fluid sample in cell 10.

Figure 2:
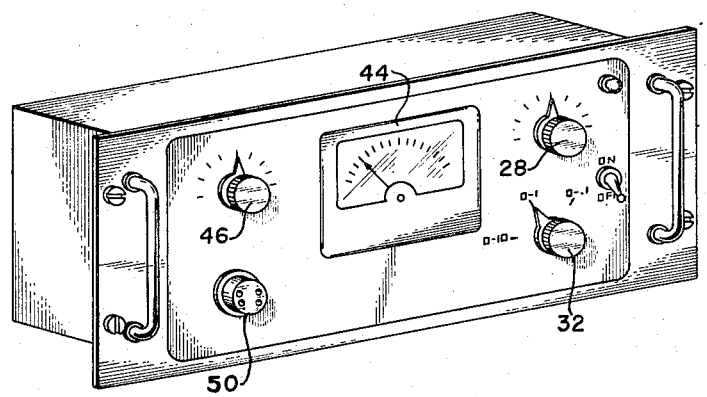
Figure 2 is a view of the invention as placed on an instrument panel of a conventional well logging unit.

The purpose of switch 32 and the attendant shunt and series resistors are to provide various ranges of resistivity. For example, these resistor values may be chosen such that, when switch 32 is in position 1—1, potentiometer 28 would have a range of 0–10 ohm/meter/meter$^2$. Then adjustment of switch 32 to position 2—2 would change the range of potentiometer 28 from 0–10 ohm/meter/meter$^2$ to 0–1 ohm/meter/meter$^2$. Further adjustment of switch 32 to position 3—3 would further change the range of potentiometer 28 from 0–1 ohm/meter/meter$^2$ to 0–.1 ohm/meter/meter$^2$. These ranges are shown at switch 32 in Figure 2. It is seen, however, that though switch 32 is not essential to the fundamental operation of the circuit, its provision with the attendant shunt and series resistances make possible more accurate measurement of muds having considerably varied resistivity ranges.

The A. C. source 48, as previously described, may be of any convenient frequency and voltage. It has been found that, though the lowest frequencies may be of utility in operation of the apparatus herein described, surrounding power sources, predominately 60 cycle, can introduce considerable noise if A. C. source 48 is also provided of such frequency. Thus, only as a practical limitation, commercial power frequencies should not be used. It has been found that 1000 cycle current, as herein exampled, is optimum for the electrode polarization effects encountered in measurements of this type and its provision is therefore recommended.

An example of a convenient A. C. source 48 is a commercial oscillator manufactured under the trade name "Unit Oscillator," Model 1214–A, by the General Radio Company, Cambridge, Massachusetts. This particular oscillator operates on 110 volts A. C. supply and has a 1000 cycle output.

It is seen that, if the cell 10 were calibrated in the constant previously described in the above cited copending application for the mud filter cake cell, resistor 46 would then need to be calibrated in the units of such a constant to enable potentiometer 28 to directly indicate the desired specific resistivity units. It has been found, however, that the highly accurate potentiometers or resistors commercially available for such service are usually calibrated directly in units of ohms resistance.

Such units are readily convenient for potentiometer 28 and may be called specific units of resistivity or decade multiples thereof. For example, if potentiometer 28 is of one thousand ohm value, then each 10 ohms would represent 1% of full scale indication. Thus, 500 ohms would be read as .5 ohm/meter/meter$^2$, assuming switch 32 to be switched to the 0–1 range, as previously described. Therefore, to take advantage of the direct calibration of such resistors and thus eliminate recalibration of such, a cell 10 may have its constant expressed directly in ohms resistance of resistor 46 rather than in terms of such a constant as previously described. Such calibration of each individual cell is easily accomplished. The cell is filled with a metal salt solution of known specific resistivity under known conditions and potentiometer 28 is adjusted to indicate such resistivity. Upon application of current to the network, the potential appearing across potential electrodes 18 and 20 is then nulled at indicator 44 by adjustment of shunting resistor 46. The resistance value then indicated by resistor 46 will be the ohms resistance constant number of that particular cell 10.

It is obvious that cell 10, herein shown in typical form, may be connected into the measuring network by several convenient means, one of such being complementary plug-in couplings. One portion of such a coupling is shown at 50 on the instrument panel illustrated in Figure 2. The complementary portion of said plug 50 is then provided with cell 10 either as an integral part thereof, or connected to cell 10 by means of electrical conductors.

When in actual operation, the mud or filter cake samples measured by this apparatus have resistivity ranges generally known, in approximation, by previous knowledge of electrical logs made of the well bore. The accurate measuring of the fluids is then made as follows. The sample cell 10, filled with the fluid sample to be measured, is connected into the measuring network which has been supplied with alternating current from A. C. source 48. Selector switch 32 is adjusted to the estimated resistivity range that the sample may have. Shunting resistor 46 is positioned at the ohms resistance constant number indicated on that particular cell. Potentiometer 28 is then adjusted until a null occurs at indicator 44. The specific resistivity of the fluid sample in cell 10 or a decade multiple of such resistivity, then is directly indicated by potentiometer 28. If no null occurs through the full adjustment range of potentiometer 28, selector switch 32 is adjusted to another range. Potentiometer 28 is again adjusted to accomplish a null.

For example, a sample is estimated to have a resistivity of about one ohm/meter/meter$^2$. Switch 32 may be adjusted in position 2—2, thus giving potentiometer 28 a range of 0–1 ohm/meter/meter$^2$. Upon adjustment of resistor 28, a null may not be achieved at indicator 44. Switch 32 is then adjusted to position 1—1. Potentiometer 28 is now provided with a range of 0–10 units of specific resistivity. Potentiometer 28 is again adjusted to obtain a null at indicator 44. Such a null may be obtained for example, at 125 ohms resistance, indicated on potentiometer 28. The specific resistance of the fluid in cell 10 is thus known to be of 1.25 ohms/meter/meter$^2$ resistivity.

As previously described, this apparatus is suitable for measuring fluids and also mud filter cakes. The term fluids, as hereinafter used in the appended claims, is therefore meant to include not only drilling mud, mud filtrate, and such various liquids, but also the mud filter cake herein described.

While only a typical preferred embodiment of the invention has been shown and described, it will be apparent that changes may be made in its construction and arrangement without departing from the spirit of said invention or the scope of the annexed claims.

That which is claimed is:

1. An apparatus for determining the resistivity of a well fluid contained in a fluid sample cell of the four electrode type comprising, a first circuit powered by a source of alternating current and connected to a first current electrode and a second current electrode of said cell, said first and second current electrodes being in electrical communication by means of a fluid sample in said cell, a means in said first circuit to provide a current through a second circuit which is proportionately variable to current variation in said first circuit, a calibrated first shunting means to divide current flow through said second circuit in a proportion of the geometry of said sample cell to the geometry of a desired unit of specific resistivity, a variable potentiometer in said second circuit, one terminal of said potentiometer and the tap of said potentiometer being adapted to exhibit a potential varied by adjustment of said potentiometer, said potentiometer being connected through a potential null indication means to a first and second potential electrode of said sample cell whereby said potentiometer may be adjusted to exhibit a potential equal to that potential found across said potential electrodes, said potentiometer being adapted, upon said first shunting means being adjusted to provide a division of current flow through said potentiometer which is in proportion to the geometry of said sample cell and said potentiometer being adjusted to provide said equal potential, to indicate the specific resistivity of said fluid as a decade factor of the ohmic resistance calibration of said potentiometer, and a second shunting means adapted to divide current flow through said potentiometer whereby other potential ranges may be found across said potentiometer while retaining said geometric proportion of current flow provided by said first shunting means.

2. An apparatus for determining the resistivity of a well fluid contained in a sample cell of the four electrode type comprising, a first circuit connected to a first current electrode and a second current electrode of said cell, said first and second current electrodes being in electrical communication by means of a fluid sample in said cell, an alternating current source in said first circuit to provide current through said fluid sample, a means in said first circuit to provide a current through a second circuit which is in proportion to current flowing in said first circuit and which is variable in response to current variation in said first circuit, a calibrated first shunting means to divide current flow through said second circuit in a proportion of the geometry of said sample cell to the geometry of a desired unit of specific resistivity, a variable potentiometer in said second circuit, one terminal of said potentiometer and the tap of said potentiometer being adapted to exhibit a potential varied by adjustment of said potentiometer, said terminal and tap of said potentiometer being connected through a potential null indication means to a first and a second potential electrode of said sample cell whereby said potentiometer may be adjusted to exhibit a potential equal to that potential found across said potential electrodes, said potentiometer being adapted, upon said first shunting means being adjusted to provide a division of current flow through said potentiometer which is in proportion to the geometry of said sample cell and said potentiometer being adjusted to provide said equal potential, to indicate the desired specific resistivity of said well fluid as a factor of the ohmic resistance indicated by said potentiometer, and a second shunting means adapted to divide current flow through said potentiometer without effect to total current flow through said second circuit whereby other ranges of potential may be found across said potentiometer.

3. An apparatus for determining the resistivity of a well fluid contained in a sample cell of the four electrode type comprising, a first circuit powered by a source of alternating current and connected to a first current electrode and a second current electrode of said cell, said first and second current electrodes being in electrical communication by means of a fluid sample in said cell, a means in said first circuit to provide a current through a second circuit which is proportionate to current flowing in said first circuit and which is variable in direct response to current variation in said first circuit, a calibrated shunting means to divide current flow through said second circuit in a proportion of the geometry of said sample cell to the geometry of a desired unit of specific resistivity, a variable potentiometer in said second circuit adapted to exhibit a potential varied by adjustment of said potentiometer, a terminal and the tap of said potentiometer being connected through a potential null indication means to a first and a second potential electrode of said sample cell whereby said potentiometer may be adjusted to exhibit a potential equal to that potential found across said potential electrodes, said potentiometer being adapted, upon said first shunting means being adjusted to provide a division of current flow through said potentiometer which is in proportion to the geometry of said sample cell and said potentiometer being adjusted to provide said equal potential, to indicate desired units of specific resistivity as a decade factor of the indicated ohmic resistance value of said potentiometer.

4. An apparatus for determining the resistivity of a well fluid contained in a sample cell of the four electrode type comprising, a first circuit powered by a source of alternating current and connected to a first current electrode and a second current electrode of said cell, said first and second current electrodes adapted to be in electrical communication by means of a fluid sample in said cell, a means in said first circuit to provide a current through a second circuit which is proportionate to current flowing in said first circuit and which is variable in direct response to current variation in said first circuit, a calibrated shunting means to divide current flow through said second circuit in a proportion of the geometry of said sample cell to the geometry of a desired unit of specific resistivity, a variable potentiometer in said second circuit connected through a potential null indication means to a first and second potential electrode of said sample cell whereby said potentiometer may be adjusted to exhibit a potential equal to a potential found across said potential electrodes, said potentiometer being adapted, upon adjustment of said first shunting means to provide a division of current flow through said potentiometer which is in proportion to the geometry of said sample cell and adjustment of said potentiometer to provide said equal potential, to indicate the specific resistivity of said fluid as a factor of the ohmic resistance calibration of said potentiometer.

5. An apparatus for determining resistivity of a well fluid comprising, a fluid sample cell of the four electrode type, a first circuit connected to a first and second current electrode of said cell, a current source connected in said first circuit adapted to supply current through a fluid sample disposed in said cell, a proportional current supply means connected in said first circuit and a second circuit to provide a current through said second circuit which is proportionately variable to current variation in said first circuit, a first shunting means connected in said second circuit to divide current flow through said second circuit in a proportion of the geometry of said sample cell to the geometry of a desired unit of specific resistivity, a variable potentiometer connected in said second circuit adapted to produce an adjustable potential which is proportionately responsive to current flow through said potentiometer, a second shunting means connected in said second circuit adapted to selectively divide current flow through said potentiometer without change in total current flow through said second circuit, and a potential null indication means connected between said potentiometer and the potential electrodes of said sample cell to indicate a balance between the potential produced across said potential electrodes by the current through said first circuit and a potential produced across said potentiometer by the current flow through said potentiometer.

6. An apparatus for determining resistivity of a well fluid contained in a fluid sample cell of the four electrode type comprising, a first circuit adapted for connection to a first and second current electrode of said cell, a current source connected in said first circuit adapted to supply current through a fluid sample disposed in said cell, a proportional current supply means connected in said first circuit and a second circuit to provide a current through said second circuit which is proportionately variable to current variation in said first circuit, a first calibrated shunting means connected in said second circuit adapted to divide current flow through said second circuit in a proportion of the geometry of said sample cell to the geometry of a desired unit of specific resistivity, a calibrated variable potentiometer connected in said second circuit adapted to produce an adjustable potential which is proportionately responsive to current flow through said potentiometer, a second shunting means connected in said second circuit adapted to selectively divide current flow through said potentiometer without change in total current flow through said second circuit, and a potential null indication means connected to said potentiometer and adapted for connection to the potential electrodes of said sample cell to indicate a balance between the potential produced across said potential electrodes by the current through said first circuit and a potential produced across said potentiometer by the current flow through said second circuit.

7. In resistivity measurement apparatus the combination of, a first circuit adapted for connection to the current electrodes of a four electrode fluid sample cell, a current source means in connection with said first circuit adapted to provide current flow through a fluid sample disposed within said cell, current supply means in connection with said first circuit and a second circuit to provide a current through said second circuit proportionate and variably responsive to the current through said fluid sample, a first calibrated shunting means in connection with said second circuit adapted to divide current flow through said second circuit in proportion of the geometry of said sample cell to the geometry of a desired unit of specific resistivity, a calibrated variable potential producing means in connection with said second circuit adapted to produce variable potentials proportionally responsive to current flow through said potential producing means, a second shunting means in connection with said second circuit adapted to selectively divide current flow through said potential producing means without change in total current flow through said second circuit, and potential null indicating means in connection between said potential producing means and adapted for connection to the potential electrodes of said sample cell to indicate a balance between a potential produced by said producing means and a potential produced between said potential electrodes by current flow through said fluid sample.

8. An apparatus for determining resistivity of a well fluid comprising, a fluid sample cell of the four electrode type, a first circuit connected to a first and second current electrode of said cell, a current source connected in said first circuit adapted to supply current through a fluid sample disposed in said cell, a proportional current supply means connected in said first circuit and a second circuit to provide a current through said second circuit which is proportionately variable to current variation in said first circuit, a calibrated shunting means connected in said second circuit to divide current flow through said second circuit in a proportion of the geometry of said sample cell to the geometry of a desired unit of specific resistivity, a calibrated variable potentiometer connected in said second circuit to produce an adjustable potential which is proportionately responsive to current flow through said potentiometer, and a potential null indication means connected between said potentiometer and the potential electrodes of said sample cell to indicate a balance between the potential produced across said potential electrodes by the current through said first circuit and a potential produced across said potentiometer by the current flow through said second circuit.

9. An apparatus for determining resistivity of a well fluid contained in a fluid sample cell of the four electrode type comprising, a first circuit adapted for connection to a first and second current electrode of said cell, a current source connected in said first circuit adapted to supply current through a fluid sample disposed in said cell, a proportional current supply means connected in said first circuit and a second circuit to provide a current through said second circuit which is proportionately variable to current variation in said first circuit, a calibrated shunting means connected in said second circuit adapted to divide current flow through said second circuit in a proportion of the geometry of said sample cell to the geometry of a desired unit of specific resistivity, a calibrated variable potentiometer connected in said second circuit adapted to produce an adjustable potential which is proportionately responsive to current flow through said potentiometer, and a potential null indication means connected to said potentiometer and adapted for connection to the potential electrodes of said sample cell to indicate a balance between the potential produced across said potential electrodes by the current through said first circuit and a potential produced across said potentiometer by the current flow through said second circuit.

10. In resistivity measurement apparatus the combination of, a first circuit adapted for connection to the current electrodes of a four electrode fluid sample cell, a current source means in connection with said first circuit adapted to provide current flow through a fluid sample disposed within said cell, current supply means in connection with said first circuit and a second circuit to provide a current through said second circuit proportionate and variably responsive to the current through said fluid sample, a calibrated variable shunting means in connection with said second circuit adapted to divide current flow through said second circuit in proportion of the geometry of said sample cell to the geometry of a desired unit of specific resistivity, a calibrated variable potential producing means in connection with said second circuit adapted to produce variable potentials proportionally responsive to current flow through said potential producing means, and potential null indicating means in connection with said potential producing means and adapted for connection to the potential electrodes of said sample cell to indicate a balance between a potential produced by said potential producing means and a potential produced between said potential electrodes by current flow through said fluid sample.

References Cited in the file of this patent
UNITED STATES PATENTS

| | | |
|---|---|---|
| 1,983,442 | Drake | Dec. 4, 1934 |
| 2,280,075 | Hayward | Apr. 21, 1942 |
| 2,599,413 | Reichertz | June 3, 1952 |
| 2,778,995 | Gross et al. | Jan. 22, 1957 |